(12) United States Patent
Lin et al.

(10) Patent No.: US 8,155,428 B2
(45) Date of Patent: Apr. 10, 2012

(54) MEMORY CELL AND PAGE BREAK INSPECTION

(75) Inventors: Jason Z. Lin, Saratoga, CA (US); Xing Chu, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 804 days.

(21) Appl. No.: 12/197,690

(22) Filed: Aug. 25, 2008

(65) Prior Publication Data

US 2009/0067703 A1    Mar. 12, 2009

Related U.S. Application Data

(63) Continuation-in-part of application No. 12/197,241, filed on Aug. 23, 2008.

(60) Provisional application No. 61/074,715, filed on Jun. 23, 2008, provisional application No. 60/970,553, filed on Sep. 7, 2007.

(51) Int. Cl.
    *G06K 9/00* (2006.01)

(52) U.S. Cl. .................................................. 382/145

(58) Field of Classification Search .................. 382/141, 382/145–151
See application file for complete search history.

(56) References Cited

U.S. PATENT DOCUMENTS

| | | | |
|---|---|---|---|
| 5,537,669 A | 7/1996 | Evans et al. | |
| 6,272,451 B1* | 8/2001 | Mason et al. | 703/13 |
| 6,493,467 B1 | 12/2002 | Okuda et al. | |
| 7,486,392 B2* | 2/2009 | Yang et al. | 356/237.2 |
| 7,796,801 B2* | 9/2010 | Kitamura et al. | 382/141 |
| 2001/0055415 A1 | 12/2001 | Nozaki | |
| 2002/0031248 A1* | 3/2002 | Maed et al. | 382/149 |
| 2004/0086170 A1 | 5/2004 | Shishido et al. | |
| 2004/0151362 A1* | 8/2004 | Hamaguchi et al. | 382/145 |
| 2006/0280358 A1* | 12/2006 | Ishikawa | 382/149 |
| 2009/0073443 A1* | 3/2009 | Shishido et al. | 356/369 |
| 2010/0088042 A1* | 4/2010 | Noguchi et al. | 702/40 |
| 2011/0001972 A1* | 1/2011 | Shishido et al. | 356/369 |
| 2011/0025838 A1* | 2/2011 | Ninomiya | 348/87 |

* cited by examiner

*Primary Examiner* — Michael A Lyons
(74) *Attorney, Agent, or Firm* — Luedeka Neely Group, P.C.

(57) ABSTRACT

A method of inspecting an array having memory blocks and page breaks. The array is imaged, and the image is divided into sections. Sections that include the memory blocks are selected into a candidate image. Pixels within a boundary horizontal line of pixels are inspected to determine horizontal edges of the memory blocks. Pixels within a boundary vertical line of pixels are inspected to determine vertical edges of the memory blocks. An image of a first memory block is compared to an image of a second memory block to determine differences. The differences are flagged as potential memory block defects. Images of the page breaks are compared to determine differences, and the differences are flagged as potential page break defects.

17 Claims, 3 Drawing Sheets

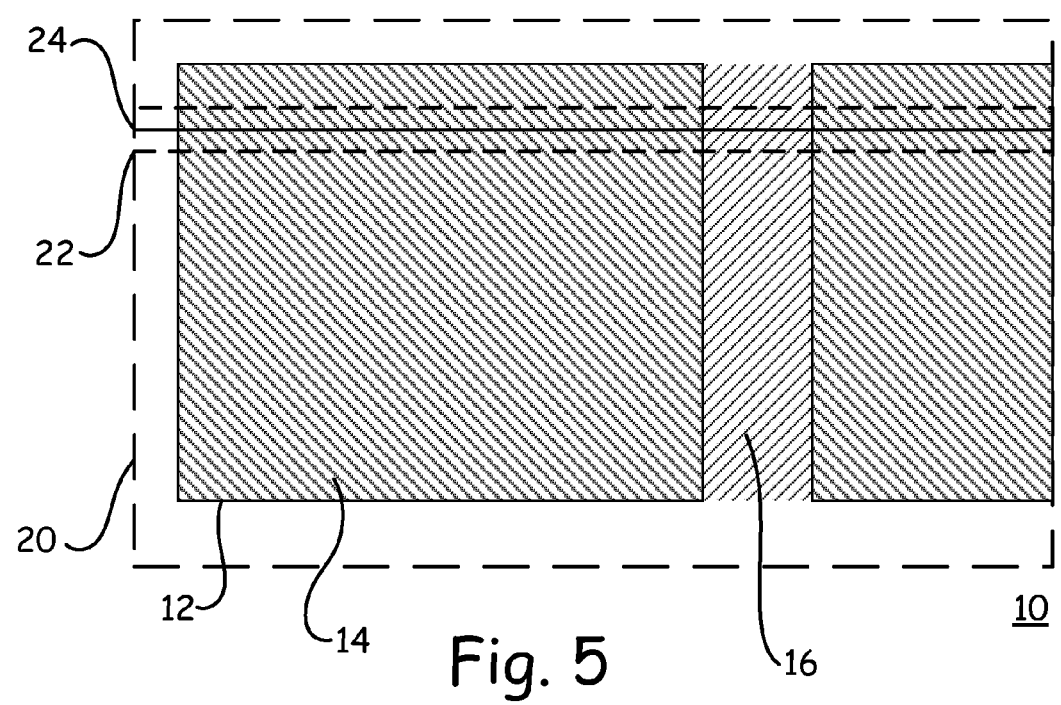

MEMORY CELL AND PAGE BREAK INSPECTION

This patent application is a continuation in part of U.S. patent application Ser. No. 12/197,241 filed Aug. 23, 2008 that claimed all rights and priority on U.S. provisional patent application Ser. No. 60/970,553 filed Sep. 7, 2007 and 61/074,715 filed Jun. 23, 2008, and claims all rights and priority thereon. The present invention relates to the inspection of memory cell areas in a memory or logic device, and more specifically to the simultaneous inspection of memory cells and their page breaks without sacrificing sensitivity.

BACKGROUND

Field

Memory arrays exist in both memory and logic devices in the integrated circuit industry. As the term is used herein, "integrated circuit" includes devices such as those formed on monolithic semiconducting substrates, such as those formed of group IV materials like silicon or germanium, or group III-V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices.

As depicted in FIG. 1, a memory array 10 typically has a large number of dense memory cells partitioned into multiple memory pages 12 that are divided by page breaks 16, which consist of circuits addressing or controlling the memory cells. These page breaks 16 often occur at different intervals within the array. Inspection of dense memory cell areas 12 in a memory or logic device 10 demands extremely high sensitivity. To achieve high sensitivity in the cell areas 12, it is desirable to do adjacent cell to cell comparisons in an optical inspection tool. Inspection of page breaks 16, however, requires adjacent page to page comparisons in the inspect tool. Because of the large and potentially irregular space between page breaks 16, page to page comparisons tend to have poorer sensitivity than the memory cell comparisons, due to the variations across the memory pages 12. In those cases where the page break 16 intervals are non-repeating in uniform periods, this page to page comparison becomes impossible in the array inspection mode 14.

One approach to resolving this problem is to use a so-called mixed mode inspection that inspects the page breaks 16 in a so-called random mode, using die to die comparisons within a single substrate, and inspect memory cells in a so-called array mode, using cell to cell comparisons within a single die.

However, mixed mode inspection has some drawbacks. For example, the dynamic range required for imaging the non-memory cell areas 16 often leaves the memory cell areas 12 with very low contrast and, thus, poor sensitivity. In addition, users have to precisely and laboriously define many small care areas of higher sensitivity for the memory cell areas, so as to avoid the memory page breaks 16. These small care areas are depicted in FIG. 1 as portions of alternate hatching extending into the memory cell pages 12. Thus, only a portion of the memory cell pages 12 can be inspected with array mode 14, as defined with hatching in one direction, while the rest of the circuit 10 is inspected with random mode, as defined with hatching in the other direction.

Defining these small care areas also creates a care border problem that is limited by the positional accuracy of the inspection tool. As a result, the border areas of the memory cells 12 often can not be inspected at high sensitivity in array mode. Also, comparing page breaks 16 from die to die tends to degrade the sensitivity because of the variation from die to die. Thus, there has not been any efficient approach in the art that can inspect both memory cells 12 and their page breaks 16 simultaneously with high sensitivity in both areas.

No matter which choice is made for the inspection, there is always the issue of care area borders that is caused by the positional inaccuracy of the inspection tool. In real inspections, the edges of the pre-defined care areas can only be located to within a certain inspection-tool-specific distance of the pattern edge desired for the inspection. So a border of this size has to be excluded from the array inspections to avoid nuisance defects from comparisons across pattern edges. This inherent limitation of any inspection tool makes detecting the defects that are close to the pattern edges almost impossible for existing array mode inspections.

What is needed, therefore, is a system that overcomes problems such as those described above, at least in part.

SUMMARY

The above and other needs are met by a method of inspecting an array having memory blocks with page breaks disposed between them. The memory array is imaged with a sensor at a magnification such that the memory cell size is a whole integer pixel multiple within the sensor. This creates an array image that is divided into sections. Those sections that include at least a portion of the memory blocks are selected into a candidate image. Pixels of the image within a boundary distance of a horizontal single line of pixels are inspected to determine horizontal edges of the memory blocks to an accuracy of a single pixel. Pixels of the image within a boundary distance of a vertical single line of pixels are inspected to determine vertical edges of the memory blocks to an accuracy of a single pixel. An image of a first memory block is compared on a pixel by pixel basis to an image of a second memory block to determine differences between pixel values in the first and second memory blocks, where the images are created at the same magnification using the imaging sensor. The differences are flagged as potential memory block defects. Images of the page breaks are compared to determine differences between pixel values of the images of the page breaks, and the differences are flagged as potential page break defects.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 5 is a depiction of a portion of an image that is being inspected for horizontal edges according to an embodiment of the present invention.

DETAILED DESCRIPTION

A new method is provided by the embodiments of the present invention, which method is generally referred to as smart array inspection, and which overcomes the drawbacks mentioned above. Smart array inspection uses image processing to automatically identify the edges of the memory cell array patterns 12, such as horizontal and vertical edges in an orthogonal Manhattan array. It thus provides a method for inspecting both memory cell areas 12 and page breaks 16 simultaneously without sacrificing high sensitivity on either area, while also addressing the care area border issue.

Figure 1:
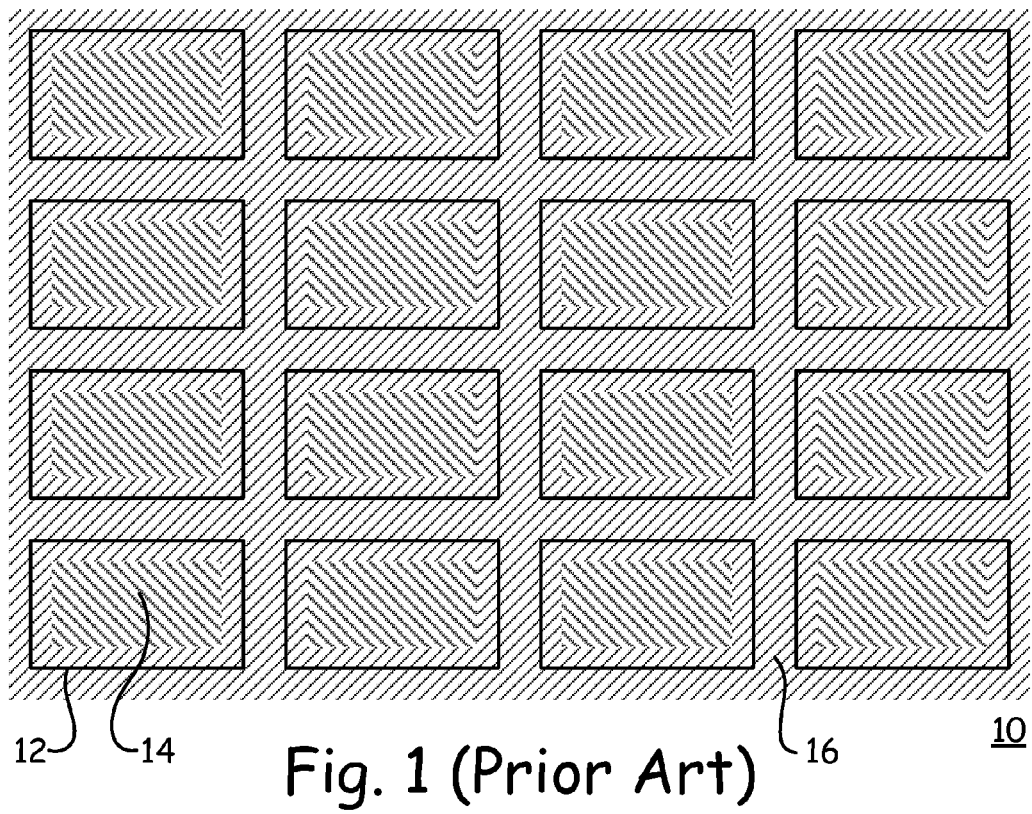
FIG. 1 is a depiction of a prior art method for inspecting the memory block areas and the page break areas of a memory array.
Figure 2:
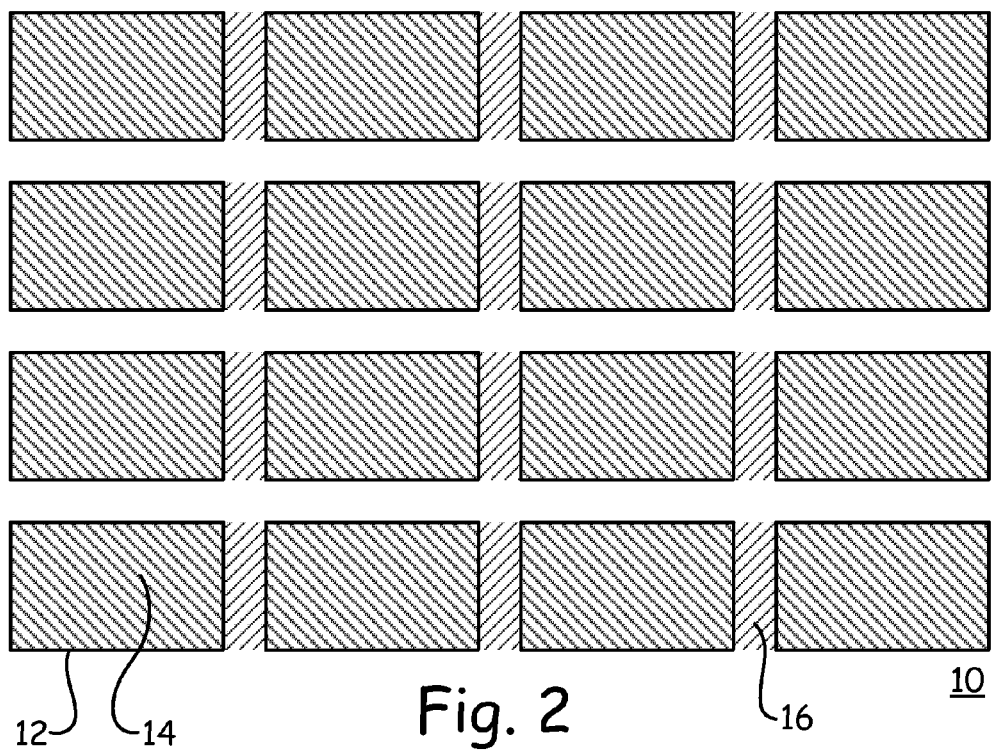
FIG. 2 is a depiction of a masked-out memory array according to an embodiment of the present invention.

To implement smart array inspection, an inspection tool is configured such that each memory cell of the dense memory areas 12 contains an integer number of pixels, as depicted in FIG. 2, which enables a very accurate adjacent cell to cell comparison, with an extremely high sensitivity for acquiring images of the inspected memory areas. An image processing technique is then applied to automatically identify the memory cell areas 12 up to their actual edges, and precisely mask out the page break areas 16, without requiring a user to pre-define the memory cell areas and the page break areas.

According to the invention, an image array can be automatically divided into memory cell areas containing only memory cells that can be inspected by cell to cell comparison, and page break areas containing only page breaks that need to be inspected separately. The identification of memory block areas relies on the fact that the images in the memory cell areas have cell to cell repeating patterns in at least one of horizontal or vertical directions. Several image processing techniques are used in the invention to identify the memory cell areas and determine the edges of the memory cell areas. In principle, image pattern matching, frequency spectra analysis of the image pattern, or their combinations can be applied to accurately determine the edges of the memory cell areas and the page break areas.

With the page break areas 16 masked-out automatically in this manner, conventional array mode defect detection algorithms can be applied to the known cell size of the memory cell areas 12. This method eliminates the need for care area border exclusions, and can detect defects using the array mode 14, even in locations that are disposed right up to the edge of the cell pattern 12. The masked-out repeating page break areas 16 can also be inspected for defects by comparing one page brake area 16 to another.

Smart array inspection is implemented in a flexible multiple step approach, with a choice of many different image processing techniques in each step, so as to achieve accurate automatic identification of the memory cell pattern areas 12. First, the inspection tool is set up so that the memory cell areas 12 can be imaged with a cell size that is an integer number of pixels at the magnification used by the tool to create an image of the memory cells 12. In other words, the outer edges of the memory cell 12 in the image that the inspection tool creates fall precisely upon pixel boundaries of the imaging sensor, not across or within a given pixel or line of pixels. Thus, a pre-recorded template image may be used but is not necessary for the implementation of smart array inspection.

In the implementation of identifying the memory cell pattern, if a prerecorded template image has been saved, the template image can be used for pattern matching in both the horizontal and the vertical directions. The template image may also be extracted from the memory array image itself by analyzing the content of the image and searching for a pattern that appears to repeat in its neighborhood area. Within the memory cell areas, the images can be matched with the template image cell by cell, and therefore the edges of the memory cells can be determined when the memory array image fails to match the template image. Techniques such as a normalized cross correlation technique, which is known to provide very accurate pattern matching, can be used. The difference between a cell image and the template image may also be used to determine if the pattern matches or not. For coping with image variation across the memory array, a matched cell image may also be used as an updated template image as needed, instead of a constant template image, so that the adjacent cell image may have better matching.

The present invention also provides a frequency spectrum analysis method for identifying the edges of memory cell areas. As illustrated in FIG. 2, the page break areas 16 between memory cells are either blank or have different patterns as compared to memory cells. For example, FIG. 2 shows a few horizontal page breaks that are blank. If the frequency spectrum of the pixels along a horizontal line in the horizontal page break is taken, the frequency spectrum contains only zero frequency components, because the pixel values are all constant. However, the frequency spectrum of pixels along a horizontal line across the memory cell areas show very strong frequency components, corresponding to the pitch frequency of the memory cells. As a result, by analyzing the frequency spectrum in the horizontal direction of the memory array, the horizontal page breaks can be identified. Similarly, vertical page breaks can also be identified by analyzing the frequency spectrum in the vertical direction of the memory array. Because a Fast Fourier transform can be used for the frequency spectrum analysis, the technique provides an efficient way of identifying the edges of the memory cell areas.

In cases where there are no clear patterns resolved for both the memory block and the page break areas, the pattern matching techniques described above might be ineffective. Therefore, the present invention also provides methods using the appropriate image attributes to distinguish the memory block areas from the page break areas. The image attributes used can include, but are not limited to, image pixel gray level, neighboring pixel gray level variation, and gradient of image pixel gray level, among others. For example, when the memory block areas are consistently brighter or darker than the page break areas, the mean gray level of the nearby pixels can be used to determine if a certain pixel is located within the memory block area or the page break area.

As discussed above, various image processing techniques are provided in the invention for automatically identifying and separating memory cell areas and page break areas in a memory array. Dependent on the resolution requirements in the edges of separating the memory cell areas and page break areas, and the pattern contents of the memory cells, different techniques may be selected, modified, or combined to optimize the performance. For example, the frequency spectrum analysis described above may be applied to the average of a few adjacent horizontal lines or vertical lines instead of a single line so that the frequency components have better signal to noise ratio. In the following, the implementation example of this invention is described in detail to better disclose the invention.

Figure 3:
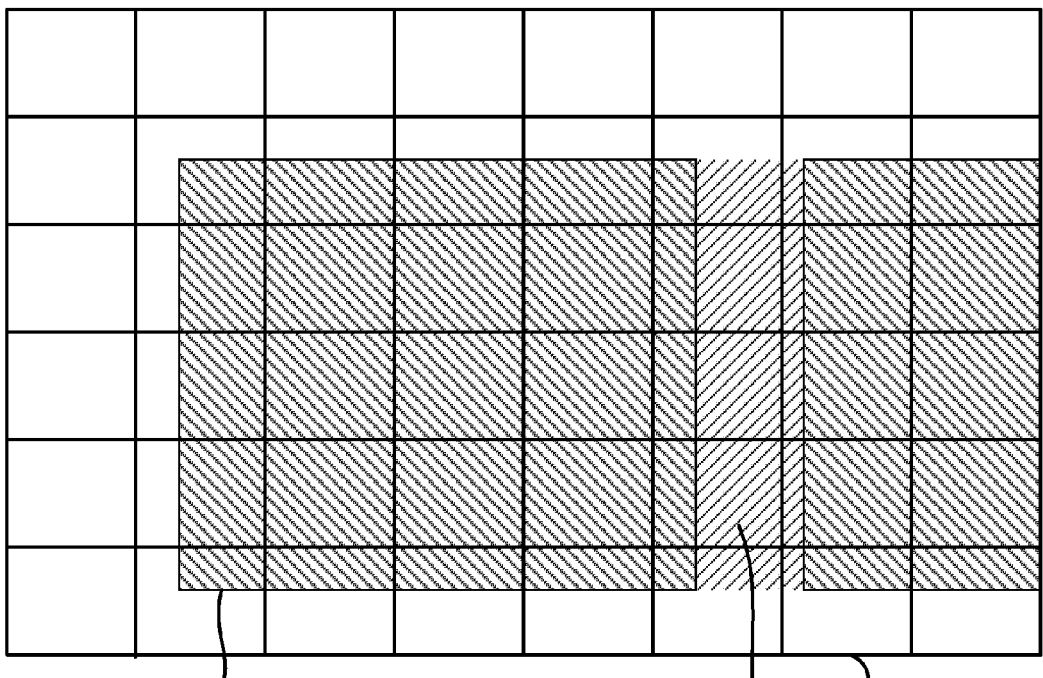
FIG. 3 is a depiction of a portion of an image that contains memory cells, according to an embodiment of the present invention.

The image 10 from the inspection tool is divided into rectangular blocks 18 that have a size that is smaller than the size of the memory cells 12, as depicted in FIG. 3, and each block 18 is individually evaluated for its content to determine whether it contains a portion of a memory cell array 12. These evaluation techniques can include simple image attributes, pattern matching, and complex spectrum analysis. Based on the results from each individual block 18, a heuristic approach is taken to identify rectangular multi-block 18 candidate regions that contain memory cell areas 12 for further processing. This step filters out the peripheral areas 16 of the memory cells 12 that often contain complex patterns or are devoid of any visible patterns. It enables the subsequent steps to accurately identify the memory cell pattern edges.

Figure 4:
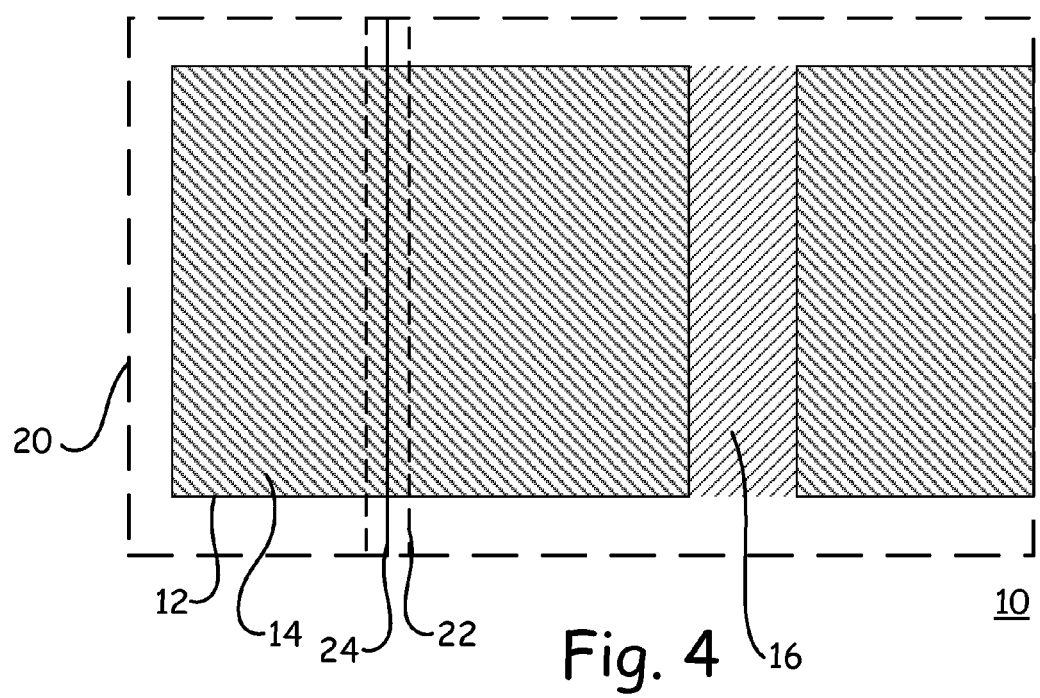
FIG. 4 is a depiction of a portion of an image that is being inspected for vertical edges according to an embodiment of the present invention.

Blocks 18 are identified as either containing memory cell areas 12 or not containing memory cell areas 12. The blocks 18 that do contain memory cell areas 12 are formed into rectangular candidate regions 20, as depicted in FIG. 4. Two independent steps are then implemented, to identify (1) the vertical edges of the memory cell areas, and (2) the horizontal edges of the memory cell areas. In some embodiments, it makes no difference which of the two steps is performed first, or whether they are performed in parallel.

To identify the vertical edges of the memory cell areas, image processing is performed on each column of pixels in the candidate regions 20, which were identified in the step above. The image processing can be implemented in one embodiment as an evaluation of a section of the image from a rectangular kernel 22 that is centered on the column 24 of pixels of interest. As above, techniques such as image attributes or pattern matching can be used for this purpose, based on the actual use case. Because the first step above has already excluded most of the peripheral areas from processing, this step accurately identifies the memory cell area 12 down to the pixel level. The processing is generally confined to within the candidate regions 20 that were defined by the previous step. This enables better accuracy in identification of the edges.

Another similar step is taken to identify the horizontal edges of the memory cell areas 12, as depicted in FIG. 5. In this step the image is evaluated for each row of pixels in the candidate regions 20, by processing the section of image in a rectangular kernel 22 that is centered on the row 24 of pixels of interest. Similar techniques to those as described above can again be used in this step. Once again, it is possible to achieve pixel level precision in the identification of the horizontal edges of the memory cell areas 12. As before, the processing is confined to within the candidate regions 20 that were defined in the previous step, which enables better accuracy in identification of the horizontal edges.

The results from the image processing steps described above can accurately identify the repeating memory cell areas 12 to within a few pixels of their actual edges. Further processing in the manner described above can accurately identify the repeating page breaks 16 as well. As mentioned above, the inspection tool is configured such that each memory cell 12 is imaged using an integer number of pixels. The identified memory cell areas 12 can therefore be inspected with a high sensitivity, by comparing like-positioned image pixels from one cell 12 to the next.

Inspecting the page break areas 16 requires more intelligent image processing to achieve the same high sensitivity in detecting defects. In principle, the repeating page breaks 16 can be identified and inspected by comparing adjacent page breaks 16. The direct page break 16 comparison, however, tends to not be able to achieve such a high sensitivity because each page break 16 might not contain an integer number of pixels when the image is acquired in such a way that the memory cells 12 contain an integer number of pixels. In other words, it is often a choice between the memory cell 12 or the page break 16 as to which can be imaged with an integer number of pixels, and according to the present invention, when there is a conflict between the two, the memory cell 12 always wins.

Therefore, to achieve a high sensitivity in the inspection of the page breaks 16, the page breaks 16 are aligned before comparing them one to another. Once the repeating sections of the page breaks 16 are identified as described above, these repeating page break areas 16 can be used to correlate, align, and register among themselves to the sub-pixel levels. Since the identification of the repeating page break areas 16 is performed to a pixel level, further registration of these page break areas 16 requires only a small search range and reduced computational power. Image interpolation techniques can be used to interpolate and align the page breaks 16 before comparing them, so as to match the page breaks 16 to the sub-pixel level, thereby eliminating the residual error that results from pixilation, and thereby achieving a higher sensitivity in the inspection process.

Thus, in the various embodiments of the present invention, the memory cell areas 12 and the page break areas 16 are identified automatically and masked separately before applying the defect detection algorithms. As a result, the defects detected in the memory cell areas 12 or the page break areas 16 are essentially binned by where they are detected. Therefore, automatic defect binning into memory cell areas 12 or page break areas 16 can be accomplished at the same time that the defects are detected. Furthermore, due to the noise nature of the patterns and the desired sensitivity in the different areas, thresholds may be applied separately to the memory cell areas 12 and the page break areas 16.

Thus, smart array inspection uses image processing techniques to automatically identify the pattern edges of the memory cell areas 12 and the repeating page break areas 16 at the pixel level. This implementation provides many benefits, including (1) achieving an increased level of sensitivity for the inspection of both the memory cell areas 12 and the page break areas 16, (2) eliminating the care area border issues for array mode inspections, (3) eliminating the need for accurately setting up a large number of small care areas, (4) providing automatic binning for separating defects in memory cell areas 12 and page break areas 16, (5) enabling the use of different defect thresholds and sensitivities for the memory cell areas 12 and the page break areas 16.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of inspecting a memory array having memory blocks with a cell size and page break blocks between the memory blocks, the method comprising the steps of:
   imaging the memory array with an imaging sensor at a magnification so that the cell size is a whole integer pixel multiple within the imaging sensor to create an array image,
   processing the memory array image to identify memory block areas that include only the memory blocks, and page break areas that include only the page break blocks,
   comparing a first memory array image of a first memory block on a pixel by pixel basis to a second array image of a second memory block to determine differences between single pixel values in the first memory block and the second memory block in the memory block areas, where the first array image and the second array image are created at a common magnification using the imaging sensor, and flagging the single pixel differences as potential memory block defects.

2. The method of claim 1, wherein the step of processing the memory array images comprises:

performing pattern matching by matching a predetermined number of columns of pixels adjacent a given pixel with pixels in the array image that are located a horizontal cell size away along a horizontal direction to determine a horizontal matching score, identifying the given pixel as horizontally bounding in the memory block areas if the horizontal matching score is greater than a pre-determined horizontal criteria, performing pattern matching by matching a predetermined number of rows of pixels adjacent the given pixel with the pixels in the array image that are located a vertical cell size away along a vertical direction to determine a vertical matching score, and identifying the given pixel as vertically bounding in the memory block areas if the vertical matching score is greater than a pre-determined vertical criteria.

3. The method of claim 2, wherein the pattern matching is accomplished by normalized cross-correlation.

4. The method of claim 1, wherein the step of processing the array images uses image attributes of pixels in the array image to distinguish the memory block areas from the page break areas.

5. The method of claim 4, wherein the image attributes include mean gray levels of neighboring pixels for a given pixel.

6. The method of claim 1, the method further comprising the steps of:

comparing a first page break image of a first page break block on a pixel by pixel basis to a second page break image of a second page break block to determine differences between single pixel values in the first page break block and the second page break block in the page break areas, and flagging the single pixel differences as potential page break block defects.

7. The method of claim 6, wherein the step of processing the array images comprises:

performing pattern matching by matching a predetermined number of columns of pixels adjacent a given pixel with pixels in the array image that are located a horizontal cell size away along the horizontal direction to determine a horizontal matching score, identifying the given pixel as horizontally bounding in the memory block areas if the horizontal matching score is greater than a pre-determined horizontal criteria, performing pattern matching by matching a predetermined number of rows of pixels adjacent the given pixel with the pixels in the array image that are located a vertical cell size away along the vertical direction to determine a vertical matching score, and identifying the given pixel as vertically bounding in the memory block areas if the vertical matching score is greater than a pre-determined vertical criteria.

8. The method of claim 7, wherein the step of pattern matching is accomplished by normalized cross-correlation.

9. The method of claim 6, wherein prior to the step of comparing the first page break image of the first page break block on a pixel by pixel basis to the second page break image of the second page break block, the method further comprises a step of aligning the first page break image of the first page break block on a pixel by pixel basis to the second page break image of the second page break block in the page break areas.

10. The method of claim 9, wherein the step of aligning the first page break image to the second page break image includes using sub-pixel interpolation of pixel values to achieve alignment accuracy to a sub-pixel level.

11. The method of claim 1, wherein the step of processing the array image comprises first dividing the array image into a plurality of orthogonal sections and then processing the array image in each one of the sections to determine if the section comprises one of only memory block areas, page break areas, and a combination of memory block areas and page break areas.

12. The method of claim 1, wherein the step of processing the array image comprises:

logically dividing the array image into orthogonal sections, selecting into a candidate image those orthogonal sections that include at least a portion of the memory blocks, inspecting pixels of the candidate image within a boundary distance of a horizontal single line of target pixels to determine horizontal edges of the memory blocks to a single pixel accuracy, and inspecting pixels of the candidate image within a boundary distance of a vertical single line of target pixels to determine vertical edges of the memory blocks to a single pixel accuracy.

13. The method of claim 12, further comprising the steps of:

comparing a first page break image of a first page break block on a pixel by pixel basis to a second page break image of a second page break block to determine differences between single pixel values in the first page break block and the second page break block in the page break areas, and flagging the single pixel differences as potential page break block defects.

14. The method of claim 13, wherein prior to the step of comparing the first page break image to the second page break image, the method further comprises a step of aligning the first page break image of the first page break block on a pixel by pixel basis to the second page break image of the second page break block in the page break areas.

15. The method of claim 14, wherein the step of aligning the first page break image to the second page break image includes using sub-pixel interpolation of pixel values to achieve alignment accuracy to a sub-pixel level.

16. A method of inspecting a memory array having memory blocks with a cell size and page break blocks between the memory blocks, the method comprising the steps of:

imaging the memory array with an imaging sensor at a magnification so that the cell size is a whole integer pixel multiple within the imaging sensor to create an array image, processing the memory array image to identify memory block areas that include only the memory blocks, and page break areas that include only the page break blocks, wherein the step of processing the memory array images comprises:

performing frequency spectrum analysis by using a predetermined number of columns of pixels adjacent a given column in the array image to identify frequency components of the given column, identifying the given column as vertically bounding in the memory block areas if the frequency components of the given column has frequency components corresponding to a vertical component of the cell size,
performing frequency spectrum analysis by using a predetermined number of rows of pixels adjacent a given row in the array image to identify frequency components of the given row, and
identifying the given row as horizontally bounding in the memory block areas if the frequency components of the given row has frequency components corresponding to a horizontal component of the cell size,
comparing a first memory array image of a first memory block on a pixel by pixel basis to a second array image of a second memory block to determine differences between single pixel values in the first memory block and the second memory block in the memory block areas, where the first array image and the second array image are created at a common magnification using the imaging sensor, and
flagging the single pixel differences as potential memory block defects.

17. A method of inspecting a memory array having memory blocks with a cell size and page break blocks between the memory blocks, the method comprising the steps of:
imaging the memory array with an imaging sensor at a magnification so that the cell size is a whole integer pixel multiple within the imaging sensor to create an array image,
processing the memory array image to identify memory block areas that include only the memory blocks, and page break areas that include only the page break blocks, wherein the step of processing the array images comprises:
performing frequency spectrum analysis by using a predetermined number of columns of pixels adjacent a given column in the array image to identify frequency components of the given column,
identifying the given column as vertically bounding in the memory block areas if the frequency components of the given column have frequency components corresponding to a vertical component of the cell size,
performing frequency spectrum analysis by using a predetermined number of rows of pixels adjacent a given row in the array image to identify frequency components of the given row, and
identifying the given row as horizontally bounding in the memory block areas if the frequency components of the given row have frequency components corresponding to a horizontal component of the cell size,
comparing a first memory array image of a first memory block on a pixel by pixel basis to a second array image of a second memory block to determine differences between single pixel values in the first memory block and the second memory block in the memory block areas, where the first array image and the second array image are created at a common magnification using the imaging sensor,
flagging the single pixel differences as potential memory block defects,
comparing a first page break image of a first page break block on a pixel by pixel basis to a second page break image of a second page break block to determine differences between single pixel values in the first page break block and the second page break block in the page break areas, and
flagging the single pixel differences as potential page break block defects.

* * * * *